Dec. 10, 1929.                G. T. MOTT                1,738,914
                     APPARATUS FOR HEAT EXCHANGING
                        Filed Aug. 4, 1926      5 Sheets-Sheet 1

INVENTOR
George T. Mott,
BY
William J. Dolan
ATTORNEY

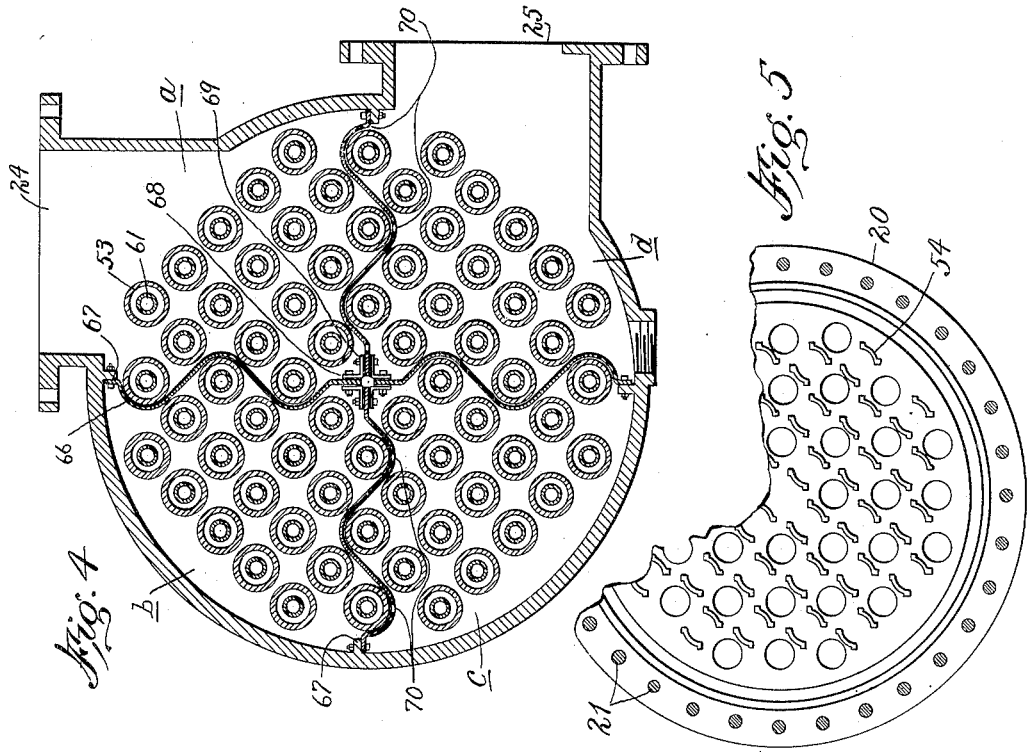
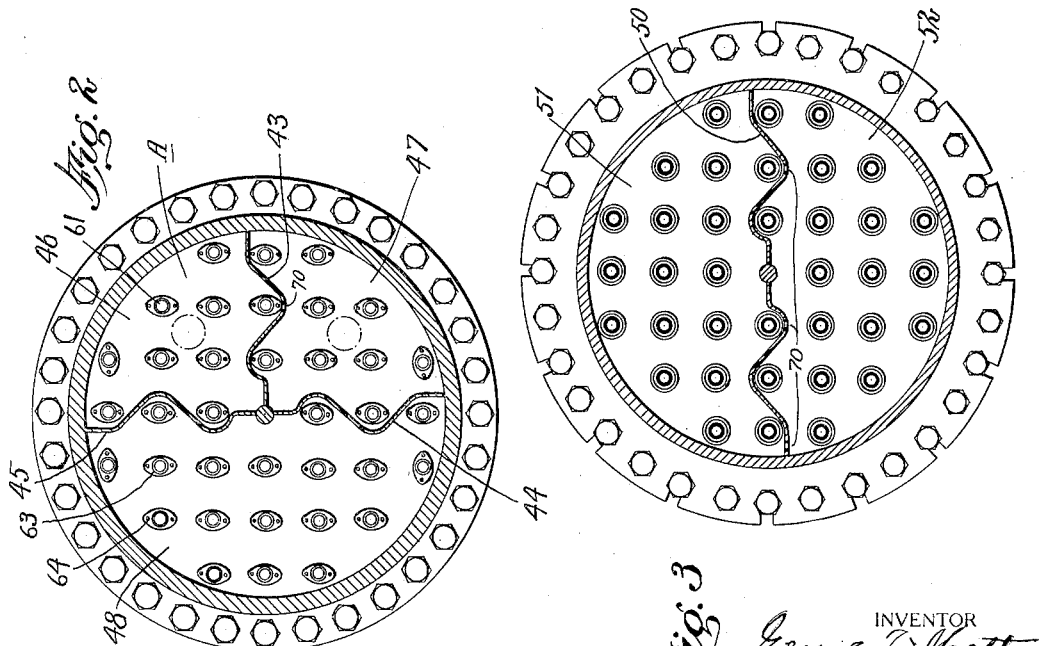

Dec. 10, 1929.                G. T. MOTT                1,738,914
                      APPARATUS FOR HEAT EXCHANGING
                         Filed Aug. 4, 1926        5 Sheets-Sheet 3
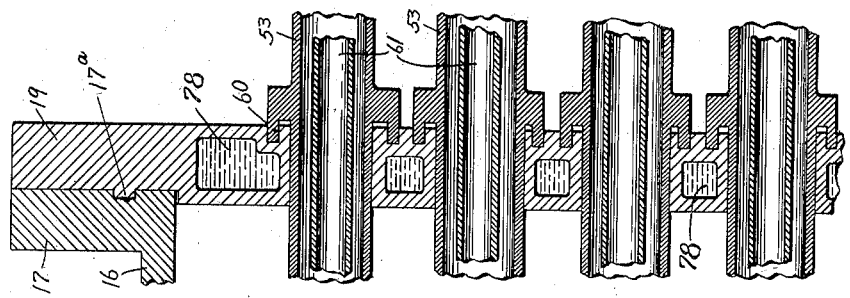
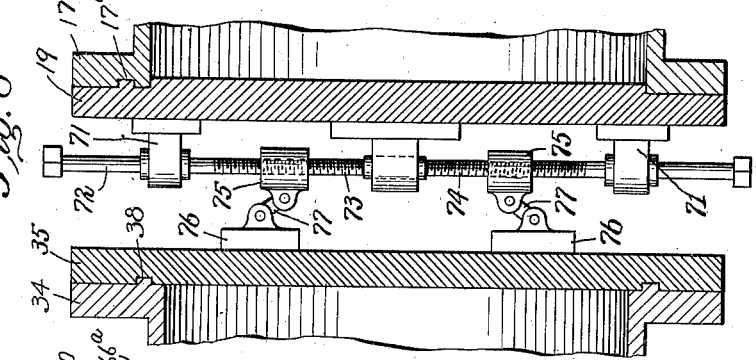
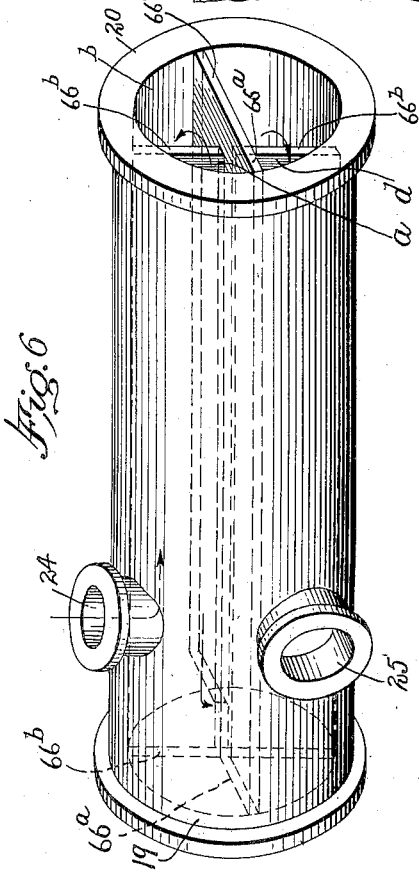
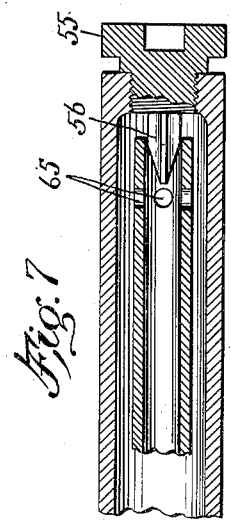
George T. Mott, INVENTOR
BY William J. Dolan, ATTORNEY

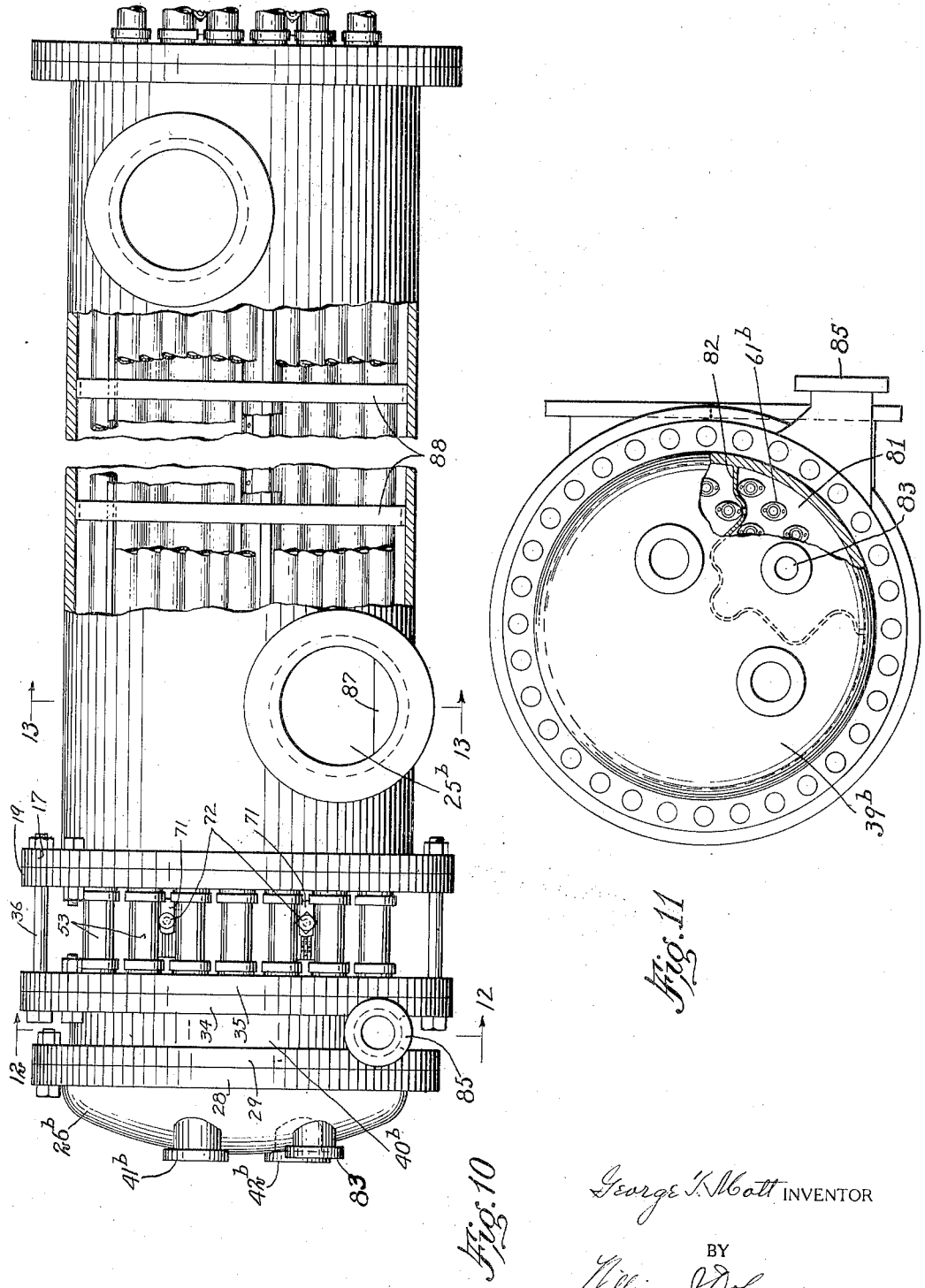

Dec. 10, 1929.  G. T. MOTT  1,738,914
APPARATUS FOR HEAT EXCHANGING
Filed Aug. 4, 1926   5 Sheets-Sheet 5
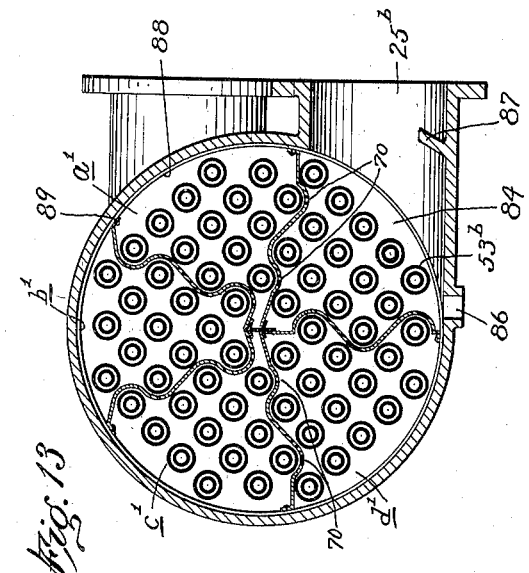
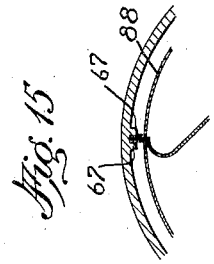
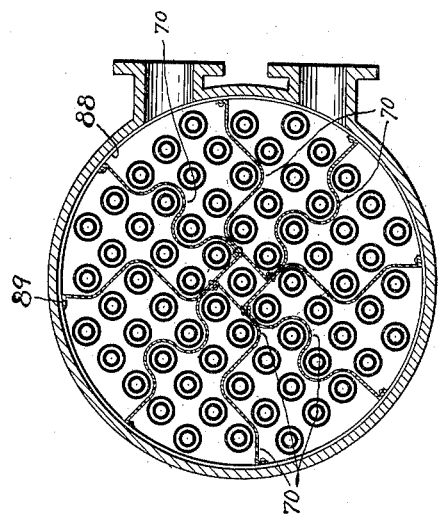
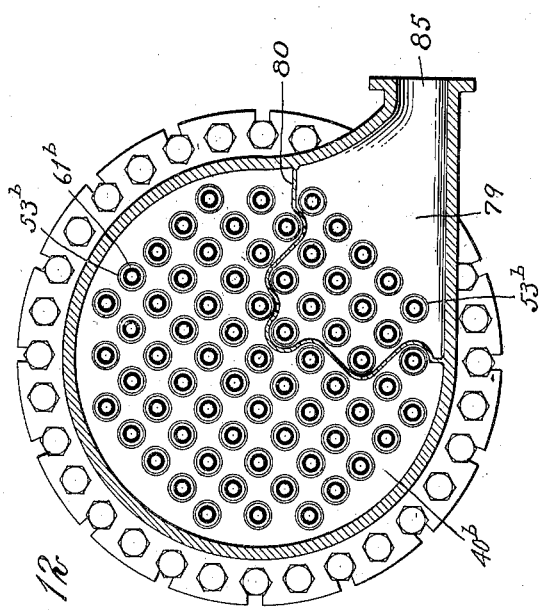
George T. Mott, INVENTOR
BY
William J. Dolan, ATTORNEY Patented Dec. 10, 1929

1,738,914

UNITED STATES PATENT OFFICE

GEORGE T. MOTT, OF PEARL RIVER, NEW YORK

APPARATUS FOR HEAT EXCHANGING

Application filed August 4, 1926. Serial No. 127,039.

The invention relates to heat exchangers, and may be used in oil refining apparatus, dephlegmators, condensers, partial condensers, steam condensers, steam heaters, water heaters, chemical apparatus, evaporators, liquid coolers and generally in any devices for cooling, condensing or heat exchanging.

Devices for heat exchanging, as commonly constructed, include in a single element, a receptacle for the heat containing agent and another receptacle for the heat absorbing agent. These receptacles are separated only by metal walls, having at appropriate points internal joints, upon the opposite sides of which flow the respective heat agents. These constructions are subject to very grave defects in the various uses of the apparatus as undue expansion caused by inequalities of temperature, corrosive action by either of said heat containing or heat absorbing agents, distortion of the parts and tendency to disintegration caused by high temperatures with resulting weakening and deformation of the parts.

Leaks also are caused which are extremely expensive because of cessation of operation of a plant and necessary repairs, and may be highly dangerous because of permitting contact of the two heat agents, and further because being internal are not visible.

With the foregoing and other defects in view, the present invention contemplates the provision of a device for heat exchanging in which the receptacles for the heat containing and heat absorbing agents shall be spaced apart and with the joints in the atmosphere, so that no contact of said agents is possible, even in the event of a leak.

According to another feature of the invention, and in one embodiment of the same, those parts of the apparatus coming in contact with the corrosive agent are made of a relatively non-corrosive metal, such as cast iron, and without diminishing the area of the heat transferring surface.

According to a further feature of the invention, the baffle plates in one receptacle forming the several passes in this embodiment are arranged in such a manner as to form sector-like passes in any desired number, and of such vertical height as to create a local circulation when operating with proper media. Also, certain parts of the heat transfer surface elements, shown here as tubes, can be segregated to form a "chill chamber", the function of which is to release the more volatile gases, or to "knock down" the condensed elements carried in suspension in the exit gases.

Further by providing proper division plates in the receptacles in which the tubes are shown to terminate, any tube can be used to form an independent circulation, or any number of tubes can be grouped to form such a circulation.

These and other improvements will be set forth in detail in the description to follow.

In the accompanying drawings which are referred to herein and form a part hereof, Fig. 1 is a view of a heat exchanger or condenser for an oil refining apparatus, partly in perspective and partly in section, made in accordance with the principles of the invention, parts being broken away and certain parts being omitted;

Fig. 2 is a transverse section taken on the line 2—2 of Fig. 1;

Fig. 3 is a similar view taken on the line 3—3 of Fig. 1;

Fig. 4 is a similar view taken on the line 4—4 of Fig. 1;

Fig. 5 is a similar view taken on the line 5—5 of Fig. 1, parts being broken away;

Fig. 6 is a perspective view of a chamber which is shown in Fig. 1, and shows in diagrammatic form the baffle plates forming the passes and the direction of flow of the said agent through the passes from the inlet to the outlet ports;

Fig. 7 is a sectional view of a detail showing a circulating member;

Fig. 8 is a view partly in section and partly in perspective, showing certain flexible connections between the receptacle for receiving the heat containing agent and a receptacle for the heat absorbing agent;

Fig. 9 is a cross section of a modified form of head for the chamber for the heat containing agent, and shows a liquid jacket for cooling said head;

Fig. 10 is a perspective view of a modification of the heat exchanger shown in Fig. 1, parts being broken away;

Fig. 11 is a plan view taken at the left of Fig. 10, parts being broken away;

Fig. 12 is a transverse section taken on the line 12—12 of Fig. 10, and shows the division plate forming an additional pass for an independent circulation, as a chill chamber;

Fig. 13 is a similar view taken on the line 13—13 of Fig. 10, showing the baffle plates forming all the passes of this modification;

Fig. 14 is a cross-section of a chamber for the heat containing or absorbing agent, illustrating the formation of any desired number of passes with the required number of baffle plates; and Fig. 15 is a cross-section of a detail.

Figure 1:
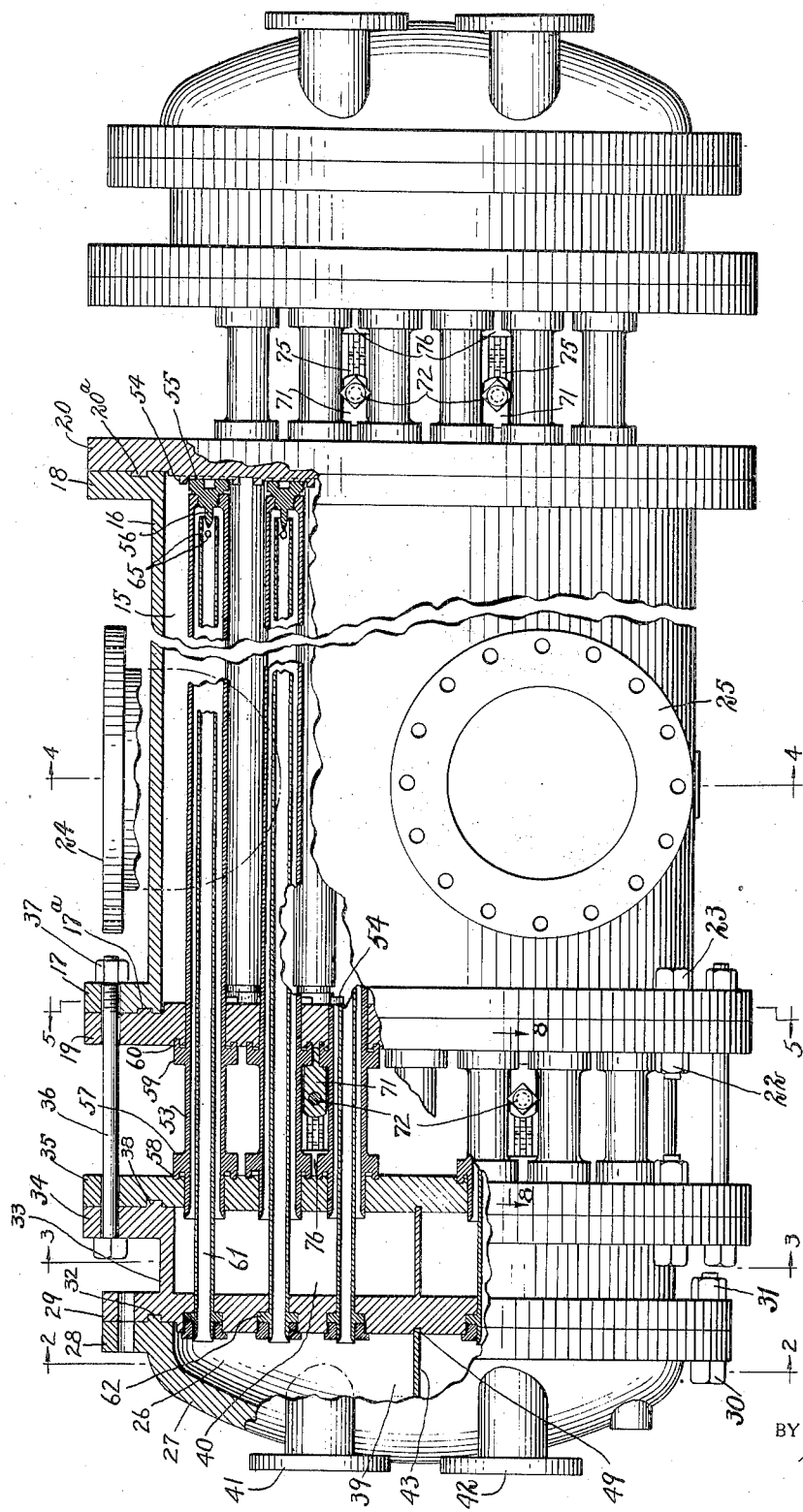

The accompanying drawings show the invention embodied in several different forms of apparatus for different uses, but it is to be understood that the invention is not limited to these particular uses, but may be employed for other and additional purposes for which a device for heat exchanging is suitable.

Referring to the drawings now in detail, and particularly to Figs. 1 to 8, inclusive, there is shown therein in its preferred form a partial condenser for oil, embodying the principles of the invention, the same, as shown, comprising a vapor chamber 15 formed with a cylindrical shell 16 having at its opposite ends outwardly extending flanges 17 and 18. To these flanges are fastened, by means of bolts 22 and nuts 23, as shown in Fig. 1, the cylinder heads 19 and 20 respectively, which correspond in outline with the said flanges as shown, a continuous groove and tongue ammonia joint 17ª being provided between said flange 17 and plate 19 and a similar joint 20ª being provided between said flange 18 and head 20. The chamber is provided with the usual vapor flow ports 24 and 25. At one end of said vapor chamber 15 and spaced apart therefrom so as to provide an air gap between them, is arranged a container 26. This container is made up of the dished plate 27 having a flange 28 which rests upon a plate 29 to which it is secured by bolts 30 and nuts 31, a continuous ammonia joint 32 existing between the flange 28 and plate 29 and providing a leak-proof jointure. The plate 29 is provided with an integral extending drum-like portion 33 having at its inner end an outwardly extending flange 34 which is secured to a plate 35, to which it corresponds in outline and to which it is secured by means of bolts 36 and nuts 37, these bolts likewise extending through the head 19 and the flange 17 of the vapor chamber 15. The flange 34 and plate 35 are also provided with an ammonia joint 38 extending entirely around the flange 34 and plate 35 and providing a leak-proof jointure. It will be seen that the receptacle 26 as thus formed is divided into two main receptacles 39 and 40, which are provided with ports 41 and 42, respectively, these receptacles being adapted to function respectively as either inlet receptacles or outlet receptacles as desired.

As shown, see Figs. 1 and 2, the receptacle 39 is sub-divided by division plates 43, 44, and 45 into chambers 46, 47, and 48, the division plates being cast integral with the plate 27 and embedded in the plate 29 with an ammonia jointure. As shown, also, see Figs. 1 and 3, the receptacle 40 is sub-divided by a division plate 50 into chambers 51 and 52. Communication between the various chambers of the said receptacles 39 and 40 is established by a system including pipes 53 which communicate through suitable orifices in the plate 35 with the chambers of the receptacle 40, and which through suitable orifices in the plate 19 extend into the vapor chamber 15, their closed ends in said chamber being freely supported on suitable curved supporting members 54, see Figs. 1 and 5, cast integrally with the plate 20. The closed ends of the tubes 53 are sealed by means of plugs 55 screwed or welded into the ends of the tubes, and which plugs have projecting finned members 56, see Figs. 1 and 7. Near their open ends the tubes 53 are formed with exterior large portions, as shown, in the form of flanges 57 having projecting portions 58 which fit into corresponding recesses in the plate 35 and flanges 59 which have projecting portions 60 fitting into corresponding recesses in the plate 19. Further reference to these features will be made.

Communicating with the chambers of the receptacle 39 are open-ended tubes 61 which at said communicating ends are formed with flanges 62 fitting into recesses in the plate 29. Around the tubes and over said flanges 62 are placed glands 63 which are fastened into place by bolts 64. As shown in Fig. 1, these tubes 61 are of smaller bore than the tubes 53 and extend into said tubes 53 being supported at their inner ends on the finned members 56, circulation between the tubes 61 and 53 being afforded by the apertures between the fins of said members 56. Increased circulation between said tubes is afforded by orifices 65 with which said inner tubes 61 are formed, as shown in Fig. 7.

It will be seen that the condensing agent, as oil, entering, for example, the receptacle 39 through the port 41 will pass into the tubes 61, see Fig. 1, and at the extreme ends of said tubes will pass between the fins of the finned members 56 and through the orifices 65 into the tubes 53 through which they will flow into the receptacle 40. Further and detailed reference to this circulation will be presently made. It is here pointed out, however, that should there be in any phase of operation a tendency toward erosion because of the continued impact of the medium discharging through the orifices in the ends of said inner tubes 61 upon the adjacent portions of the outer tubes 53 or because of the continued impact of the medium upon the outer surfaces of said outer tubes, this construction is such, that both said inner and outer tubes may be shifted to bring into play a fresh surface upon which the medium may impinge.

Referring now to the vapor chamber 15, it is important that the vapor entering said chamber, as through the port 24, shall pass therethrough with great velocity in order that the heat transfer from the vapor to the oil circulating through the tubes may be effected efficiently. While instrumentalities of various forms may be used, for this purpose, preferred means are provided, the same as shown, see Figs. 4 and 6, comprising corrugated baffle plates 66 extending longitudinally of the vapor chamber to which, in the embodiment illustrated in Figs. 1 to 8, they are secured by fastening the baffles to lugs 67 projecting from the inner surface of the vapor chamber, as shown in Fig. 4 and preferably extending the full length of the chamber cylinder. Along their inner edges the said baffle plates, in this embodiment four in number, are secured together by angle irons 68 to which they are fastened with bolts 69. It will be seen, as diagrammatically illustrated in Fig. 6, that in this manner four passes are provided in the vapor chamber, and to establish proper communication between and route of flow through said passes, the two horizontal baffle plates 66$^a$ contact each at one end with the head 20 of the vapor chamber, while at their opposite ends one of said plates is spaced apart a suitable distance from said head 19, while the other plate contacts with the head 19, as clearly shown in said Fig. 6. In a similar manner the two vertical baffle plates 66$^b$ have complete contact each at one end with the head 19 of the vapor chamber, and the opposite ends are suitably spaced apart from said head 20.

Referring to Fig. 6, it will be seen that vapor entering the port 24 will flow in the direction of the arrow to the opposite end of the vapor chamber through a chamber $a$, see also Fig. 4, to the head 20 against which it impinges and from which it is deflected, following the direction of the arrow, into the chamber $b$, the length of which it will traverse and then impinging upon the head 19 and being deflected therefrom will flow downwardly as indicated by the arrow at the left in Fig. 6 into a chamber $c$, see also Fig. 4, through which chamber $c$ it will flow to the right again impinging at the end of the chamber against the head 20, and being deflected from the head will follow the direction of the lower arrow and flow through the chamber $d$ leaving the chamber through the port 25. It may here be noted that the deflecting of the hot vapor from the cylinder heads 19 and 20 causes a turbulence which increases the heat transfer effect. Suitable drip orifices 70 are provided in the horizontal baffle plates for the escape of any condensate that may remain in the furrows of said baffles.

Referring again to the circulation of the condensing agent, it will be seen that the agent, as oil, entering the receptacle 39, for example, will be received in the chamber 46, see Figs. 1 and 2, which it will leave through those of the inner pipes 61 shown in the chamber 46, see Fig. 2, and flow thence into those of the pipes 53 which traverse the pass $a$ of the vapor chamber, see Fig. 4. By these pipes 53 it will be conducted into the chamber 51, see Fig. 3, of the receptacle 40, where it will flow to the left of said chamber and enter those of the outer pipes 53 shown in pass $b$ of Fig. 4. Traversing the length of said outer pipes 53 it will return through those of the inner pipes 61, shown in said pass $b$ in Fig. 4, to the chamber 48, see Fig. 2, where it will flow downwardly and into those of the inner pipes 61 shown in pass $c$ of Fig. 4, through which it will flow into those of the outer pipes 53 shown in said pass $c$, returning by means of said pipes 53 to the chamber 52 of said receptacle 40, see Fig. 3. The oil then flows to the right of said chamber 52 and enters those of the outer tubes 53 shown in the pass $d$ of Fig. 4, flowing through said tubes into those of the inner tubes 61 shown in said pass $c$ by means of which it reaches the chamber 47 of the receptacle 39, from which it is discharged through the port 42. The oil on its journey through the various pipes in the passes receives the heat from the vapor flowing through such passes. It is obvious that the direction of the circulation may be reversed and that the cool oil, which is to extract heat from the vapor, may enter the receptacle 40 through the port 42 and be discharged through the port 41 of the receptacle 39. Also, when used for certain other purposes, the heat containing agent may flow through the pipes, while the heat absorbing agent may pass through the chamber 15.

Referring now to another feature of the invention, it will be seen that due to the extreme variations of temperature to which the vapor chamber cylinder 16 is subjected, the parts thereof are subjected to great strain, and the heads 19 and 20 tend to warp and be distorted, thus causing a liability to leaks at the joints of the heads and tubes passing through them. It will be seen that by properly joining the bolts 36 and nuts 37, the plate 35 of the container 26 is brought into close contact with the flanges 58 of the tubes 53, and a similar close contact is brought about between the plate 19 and the flanges 59 of said tubes 53. To increase this contact, additional means are provided, the same as shown, see Fig. 8, comprising supporting members 71 in which is rotatably mounted a rod 72 oppositely screw-threaded in its portions 73 and 74. Mounted on the rod 72 are collars 75 internally threaded to correspond with the portions of the rod on which they are mounted. Formed on the plate 35 are lugs 76, and connecting said lugs 76 and collars 75 are links 77 pivotally connected to said lugs and collars. It will be seen that by turning said rod 72 in one direction a force will be exerted tending to draw said plate 35 and head 19 together, and that by turning the rod in the opposite direction said tendency may be reversed. It will be seen that by means of the flanges 57 and 59 on the tubes 53, the bolts and nuts 36 and 37, the bolts and nuts 22 and 23, and the rod 72 with its accompanying members, the vapor chamber 15, and the container 26 are rigidly engaged in a unitary structure, the force exerted by said engaging means being extreme in degree and preventing any warping of the head 19 or distortion of the parts connected therewith.

It will be seen that because of the pressure at which the oil is introduced into the container, it is good practice to make said container and its various plates of steel in order to resist said pressure. The tubes 53 and 61 however because of their small bore, and because of the fact that they are loosely mounted in the supporting members 54 on the cylinder head 20, thus affording sufficient room for expansion, have sufficient strength when made of cast iron to resist the pressure of the oil. Because of the fact that the container 26 and vapor chamber cylinder 16 are spaced apart, the pressure exerted by the oil in the container 26 will have no effect upon the parts of the vapor chamber 15, and the latter, when the vapor chamber is to be used for low pressure agents, may be made of a metal of less strength than steel, and one which will be adapted to resist corrosion. Preferably, cast iron is used in the construction of the vapor chamber and its heads, and as has been said, in the construction of the inner and outer tubes 53 and 61. This feature of the invention affords a very great advantage over the constructions of the art, the parts of which, because they are usually made of steel, are corroded very quickly and must be frequently repaired and replaced.

Another striking advantage of the construction heretofore described, is due to the fact that the joints between the various receptacles and the circulating pipes 53 are located entirely outside the vapor chamber 15. Consequently, if any leak should happen, it would be instantly visible, thus avoiding any contact between the heated vapor and the oil, which contact occurs in constructions of the art because of the internally situated joints with their recurring leaks. These leaks in said constructions of the art cause serious damage, due to spoiling of the "batch", and stoppage of the plant for necessary repairs, and the expense of said repairs. Being internal, these leaks, also, are not visible and may exist for some time and bring about serious consequences, before being discovered.

As has been stated, the invention is not limited to the device in connection with which it has thus far been described, but may be used in any apparatus in which a device for heat exchanging is employed.

In Fig. 9 is shown a modified form of the head 19 in which said head is formed with circulating passages 78 through which flows a cooling medium, the advantage of which will be obvious.

In the construction as thus far described, and which in itself constitutes a complete operative device, one container 26, shown at the left of the vapor chamber 15 in Fig. 1, and the circulating pipes entering said vapor chamber from said container 26, have been described. It is to be noted however, and it is a meritorious feature of the invention, that the container and circulation tubes thus far described are duplicated at the other end of the vapor chamber 15, the tubes 53 in this instance entering the vapor chamber through orifices in the head 20 of said chamber and their closed ends being loosely mounted upon supporting members 54 formed on the inner surface of the head 19 of said vapor chamber, said tubes thus entering the vapor chamber from the right being staggered in relation to the tubes entering said chamber through the opposite head at the left. It is thought to be unnecessary to describe in detail these parts at the right as they correspond exactly in characteristics to those parts of the apparatus connected to the vapor chamber at the left. It is to be noted however that by thus increasing the number of pipes entering the vapor chamber, the capacity of the device is correspondingly increased, and for the reasons heretofore stated, said additional tubes may likewise be formed of cast iron or other metal adapted to resist corrosion.

In Figs. 10 to 13, inclusive, is illustrated another modification of the invention by means of which it is possible to condense partially by exchanging heat to oil in one section of the vapor chamber and complete the condensation with another agent, as water, in the final passes, and all within the shell of one instrument. As shown, therefore, a complete circulating system is indicated comprising the inlet and outlet ports 41$^b$ and 42$^b$, the oil entering through one of said ports as 41$^b$, and after flowing through various outer and inner tubes 53$^b$ and 61$^b$ arranged in the various chambers of the oil container 26$^b$, and passes $a'$, $b'$, $c'$, and $d'$, see Fig. 13, passes out through outlet port 42ᵇ. Another and independent circulation, however, is established by providing in the inner receptacle 40ᵇ of the container 26ᵇ another chamber 79 by means of the additional division plate 80, and a corresponding chamber 81 in the outer receptacle 39ᵇ by means of the division plate 82. By means of a port 83 a cooler condensing agent, as water, is admitted to the chamber 81, where it passes into those of the inner tubes 61ᵇ which project into said chamber, and traversing the length of said tubes, communicates with those of the outer tubes 53ᵇ as are comprised in the additional pass 84 and which terminate in the chamber 79, the water thence passing from said chamber 79 through the outlet 85. A port for the condensates is shown at 86, see Fig. 13. Due to the lower temperature in this pass 84, there may be a heavier drip of condensates, and to prevent the same from flowing out with the vapor through the vapor outlet port 25ᵇ, a deflecting plate 87 is provided in said port 25ᵇ, to turn the drip back into the outlet 86. The locating of this independent circulating system is not limited to the final passes of the system, but any pass may be selected within which to place this circulating system, the proper arrangement of the independent chambers and ports for the independent system being provided.

In Fig. 14 is illustrated another modification of the invention, showing eight baffle plates dividing the chamber 15, as more particularly employed for liquid heat exchanging, into as many passes. It will be seen that by the use of these multiple corrugated plates as many passes may be made in the chamber as may be desirable in any particular condition of operation. It will be seen that the depth of each pass is such that a sufficient local or vertical circulation of the oil in each pass is established, such depth, preferably and as shown, being substantially equal to the radius or half the width of the receptacle, and that the combined maximum vertical dimensions of said passes exceeds the height of the receptacle.

The sector-like passes, while substantially equal in cross-sectional area, are located in different vertical relationship to each other, this relation bringing about a complete tumbling effect in the flow of liquid from one pass to the other, whereby stratification of the liquid is entirely avoided and whereby a continuous turbulence is promoted to the end of any of the passes. This effect is also contributed to by the corrugated baffle plates.

In Figs. 13 and 14 is shown another modification of the invention, having particular reference to the baffle plates. In the construction first described, the baffle plates were shown as fastened securely to the inner surface of the vapor chamber. In the modifications shown in Figs. 13 and 14 bands 88 are provided which encircle the outer edges of the baffle plates at suitable intervals, said outer edges being secured to the inner surfaces of said bands, as indicated in Figs. 13 and 14, by fastening means 89. The baffle plates are connected at their inner edges in any suitable manner, as indicated in said Figs. 13 and 14. It will be seen that with these baffle plates secured in this manner at their inner edges and at their outer edges to the bands as described, they form a cage-like structure which is freely removable from the vapor chamber, and the advantages of which will be apparent to those skilled in the art.

In Fig. 15 is shown a modified form of means for securing the baffle plates to the cylinder. As shown, the lugs 67 are disposed in pairs and the edges of the baffle plates rest between the pairs. The baffles are held together by bands 88 to form a cage, and as shown, without interfering with the engagement of the baffle plates with the pairs of lugs. The bands may be continuous or broken up into suitable divisions either continuous or spaced apart. It is obvious that the baffle plates may be used without the bands 88, as in the construction shown in Fig. 4, and as thus used, have their edges engaged in the pairs of lugs 67 as in the case of the construction shown in Fig. 15.

It will be noted that while references have been made to the chamber 15 as a vapor chamber or receptacle for the heat containing agent, it is to be understood that the operation of the entire device may be reversed and the heat absorbing agent pass through said chamber 15 while the heat containing agent circulates through the tubes.

The invention in its broader aspects is not limited to the particular constructions shown and described, as many changes may be made in the details thereof without departing from the invention or sacrificing its chief advantages; nor is the invention confined to the particular uses described, as it may be used in a device for heat exchanging in any art in which such a device may be employed. For example, while the preferred embodiments shown and described for the reasons stated, comprise a pair of receptacles for heat containing and heat absorbing agents, spaced apart with only securing means between, a cover wholly or partly removable might be placed over the space intervening between said receptacles, which cover would permit access to and a view of such intervening space. Such a construction would come within the scope of the invention, as it also would even if some agent, as oil, were to be contained in such space under said cover.

I claim:

1. A device for heat exchanging, including in combination, a pair of receptacles spaced apart, tubes extending between said receptacles and penetrating the opposite heads thereof, said tubes having each a pair of outwardly extending flanges adapted to contact with said opposite heads and maintain said receptacles spaced apart.

2. A device for heat exchanging including in combination, a pair of receptacles spaced apart, tubes extending between said receptacles and penetrating the opposite heads thereof, said tubes being each enlarged exteriorly between said opposite heads to contact with said opposite heads and maintain said receptacles spaced apart.

3. A device for heat exchanging including in combination, a pair of receptacles spaced apart, tubes extending between said receptacles and penetrating the opposite heads thereof, said tubes being each enlarged exteriorly between said opposite heads to contact with said opposite heads and maintain said receptacles spaced apart, and means comprising mounting means on one of said receptacles, a rod rotatably mounted in said means, said rod being screw threaded in opposite directions, internally threaded collars mounted on said rod, lugs on the other of said receptacles, and links pivotally engaged to said lugs and to said collars, whereby when said rod is rotated in one direction a force is exerted tending to draw said receptacles together.

4. A device for heat exchanging including in combination, a pair of receptacles spaced apart, tubes extending between said receptacles and penetrating the opposite heads thereof, said tubes being each enlarged exteriorly between said opposite heads to contact with said opposite heads and maintain said receptacles spaced apart, means comprising mounting means on one of said receptacles, a rod rotatably mounted in said means, said rod being screw threaded in opposite directions, internally threaded collars mounted on said rod, lugs on the other of said receptacles, links pivotally engaged to said lugs and to said collars, whereby when said rod is rotated in one direction a force is exerted tending to draw said receptacles together, and tongue and groove engagements between the contacting portions of said heads and said enlarged portions of said tubes.

5. In or for the vapor chamber of a device for heat exchanging, said chamber having inlet and outlet ports, a plurality of baffle plates arranged to divide said chamber into sectors and disposed with relation to the walls of said chamber to provide a continuous passage from inlet to outlet port for the vapor entering said chamber, and a member surrounding said baffle plates, said baffle plates at their outer edges being fastened to said member and being secured together at their inner edges, whereby said baffle plates and surrounding member are freely removable from said vapor chamber.

6. In or for the vapor chamber of a device for heat exchanging, said chamber having inlet and outlet ports, a plurality of baffle plates arranged to divide said chamber into sectors and disposed with relation to the walls of said chamber to provide a continuous passage from inlet to outlet port for the vapor entering said chamber, and band-like members surrounding said baffle plates, said baffle plates at their outer edges being fastened to said members and being secured together at their inner edges, whereby said baffle plates and members form a cage freely removable from said vapor chamber.

7. A device for heat exchanging including in combination, a central receptacle, a pair of containers located one at each end of said receptacle and spaced apart therefrom, each of said containers being divided by a partition wall into receptacles, and circulating means between the receptacles of each container, each said circulating means projecting into said central receptacle.

8. A device for heat exchanging including in combination, a central receptacle, a pair of containers located one at each end of said receptacle and spaced apart therefrom, each of said containers being divided by a partition wall into receptacles, one of the receptacles in each container having tubes communicating therewith and having closed ends projecting into said central receptacle, the other receptacle in each of the containers having tubes open at both ends communicating therewith and projecting through the first named receptacle of the container and into said first named tubes and communicating therewith.

9. In a device for heat exchanging, a receptacle, a container comprising an inlet receptacle and outlet receptacle, said receptacles being separated by a partition wall, and each being divided into chambers by division plates, an independent inlet port in a chamber in said inlet receptacle, an independent port in a chamber in said outlet receptacle, and circulating means comprising inner and outer tubes between said chambers.

10. A heat exchanger including in combination, a main receptacle, a container comprising an inlet receptacle and an outlet receptacle each divided into chambers, circulating means comprising inner and outer tubes between said receptacles, an independent inlet port in a chamber in said inlet receptacle, an independent port in a chamber in said outlet receptacle, and circulating means comprising inner and outer tubes between said last named chambers, whereby an independent circulation is established.

11. A heat exchanger including in combination, a main receptacle, a container spaced apart therefrom, said receptacle and container having oppositely disposed heads, means for holding said receptacle and container in unitary engagement, and means arranged between said heads for counteracting the pressure thereon by the heat exchange mediums entering said receptacle and container respectively.

12. A heat exchanger including in combination, a main receptacle having inlet and outlet ports, containers spaced apart therefrom at the opposite heads thereof, each container being divided into outer and inner secondary receptacles and each receptacle being divided into chambers, and inner and outer tubes communicating between the chambers of the outer and inner receptacles respectively of each container, and projecting into said main receptacle in staggered relation, substantially as described.

13. A heat exchanger including in combination, a main receptacle, a container spaced apart therefrom, said receptacle and container having oppositely disposed heads, and tubes communicating with said container and projecting into said receptacle, one of said tubes being enlarged exteriorly between said opposite heads to contact therewith and maintain said receptacles spaced apart.

In testimony whereof, I have affixed my signature hereto.

GEORGE T. MOTT.